(12) United States Patent
He et al.

(10) Patent No.: US 12,245,191 B2
(45) Date of Patent: Mar. 4, 2025

(54) DOWNLINK CONTROL MONITORING OPERATIONS IN WIRELESS COMMUNICATION

(71) Applicant: Apple Inc., Cupertino, CA (US)

(72) Inventors: Hong He, Sunnyvale, CA (US); Chunhai Yao, Beijing (CN); Chunxuan Ye, San Diego, CA (US); Dawei Zhang, Saratoga, CA (US); Haitong Sun, Cupertino, CA (US); Jie Cui, San Jose, CA (US); Oghenekome Oteri, San Diego, CA (US); Wei Zeng, Saratoga, CA (US); Weidong Yang, San Diego, CA (US); Yang Tang, San Jose, CA (US); Yuchul Kim, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 17/442,539

(22) PCT Filed: May 14, 2020

(86) PCT No.: PCT/CN2020/090275
§ 371 (c)(1),
(2) Date: Sep. 23, 2021

(87) PCT Pub. No.: WO2021/226938
PCT Pub. Date: Nov. 18, 2021

(65) Prior Publication Data
US 2023/0067433 A1    Mar. 2, 2023

(51) Int. Cl.
*H04W 68/02*    (2009.01)
*H04W 24/08*    (2009.01)
(Continued)

(52) U.S. Cl.
CPC .......... *H04W 68/02* (2013.01); *H04W 24/08* (2013.01); *H04W 74/0816* (2013.01); *H04W 76/28* (2018.02)

(58) Field of Classification Search
CPC . H04W 68/02; H04W 24/08; H04W 74/0816; H04W 76/28; H04W 52/0216; H04W 76/11; Y02D 30/70
See application file for complete search history.

(56) References Cited

U.S. PATENT DOCUMENTS 10,492,138 B2    11/2019    Yu
10,681,673 B2    6/2020    Hong
(Continued)

FOREIGN PATENT DOCUMENTS

CN    101453788 A    6/2009
CN    105307203 A    2/2016
(Continued)

OTHER PUBLICATIONS

Chang, Chia-Wei, and Jyh-Cheng Chen. "UM paging: Unified M2M paging with optimal DRX cycle." IEEE Transactions on Mobile Computing 16.3 (2016): 886-900. (Year: 2016).*

(Continued)

*Primary Examiner* — Sharad Rampuria
(74) *Attorney, Agent, or Firm* — Sterne, Kessler, Goldstein & Fox P.L.L.C.

(57) ABSTRACT

Some aspects of this disclosure include apparatuses and methods for implementing mechanisms for downlink control information between an electronic device (for example, a UE) and a network for cell detection and measurement. For example, some aspects relate to an electronic device including a transceiver and a processor communicatively coupled to the transceiver. The processor monitors one or more paging occasions within a discontinuous repetition cycle (Continued)

(DRX) and can make a determination of one or more paging occasions within the DRX to not monitor. Each paging occasion may include a transmission by the network of downlink control information for one or more paging messages.

15 Claims, 10 Drawing Sheets

(51) Int. Cl.
    *H04W 74/0816* (2024.01)
    *H04W 76/28* (2018.01)

(56) References Cited

U.S. PATENT DOCUMENTS

| | | | |
|---|---|---|---|
| 10,952,142 | B2 | 3/2021 | Radulescu et al. |
| 2012/0275366 | A1* | 11/2012 | Anderson ......... H04W 52/0219 370/311 |
| 2015/0358841 | A1* | 12/2015 | Wang .................... H04W 24/08 455/458 |
| 2018/0192436 | A1 | 7/2018 | Yi et al. |
| 2020/0084747 | A1* | 3/2020 | Hong .................... H04W 72/23 |

FOREIGN PATENT DOCUMENTS

| | | |
|---|---|---|
| CN | 109565789 A | 4/2019 |
| CN | 110881210 A | 3/2020 |
| KR | 20200028822 A | 3/2020 |
| WO | WO 2018144873 A1 | 8/2018 |
| WO | WO 2020055102 A1 | 3/2020 |

OTHER PUBLICATIONS

International Search Report and Written Opinion of the International Searching Authority directed to related International Patent Application No. PCT/CN2020/090275, mailed Feb. 18, 2021; 11 pages.
Samsung, "Reference Frame & PO Determination for Paging Reception," 3GPP TSG-RAN2 101bis., R2-1804312, Apr. 20, 2018; Retrieved Sep. 14, 2021; 6 pages.
Nokia et al., "Paging in NR-U ," 3GPP TSG-RAN WG2 Meeting #107bis, Chongqing, China, Oct. 14-18, 2019, R2-1912987, retrieved on Oct. 4, 2019; 3 pages.
Nokia et al., "NR-U Paging," 3GPP TSG-RAN WG2 Meeting #107, Prague, Czech Republic, Aug. 26-30, 2019, R2-1909245, retrieved on Aug. 16, 2019; 3 pages.
Extended European Search Report directed to related European Application No. 20935650.0, mailed Nov. 8, 2023; 12 pages.
Office Action issued in Chinese Patent Application 202080100454.X dated Dec. 12. 2024, 14 pages.

* cited by examiner

DOWNLINK CONTROL MONITORING OPERATIONS IN WIRELESS COMMUNICATION

CROSS REFERENCE TO RELATED APPLICATIONS

The present application is a United States National Phase of International Application No. PCT/CN2020/090275, filed on May 14, 2020, which is incorporated herein by reference in its entirety.

BACKGROUND

Field

The described aspects generally relate to cell detection and measurement in wireless communications. For example, the aspects of this disclosure relate to mechanisms for monitoring downlink control information between an electronic device (for example, a user equipment (UE)) and a network.

Background

While a user equipment (UE) is connected to a base station (for example, an evolved Node B (eNB)) in one cell to communicate through the wireless network associated to that base station, the UE can monitor one or more occasions of downlink control information, such as paging occasions. Generally, the UE monitors one paging occasion per discontinuous repetition cycle. Increasing the number of paging occasions per discontinuous repetition cycle can have a detrimental effect on UE power consumption, such as increased power consumed by a transceiver or baseband processor of the UE. Furthermore, a UE can receive signals in a bandwidth part (BWP) that includes multiple sub-bands (e.g., more than one 20 MHz sub-band). However, receiving a signal based on Listen Before Talk (LBT) may fail for some of the BWP sub-bands, resulting in puncturing of the intended signal, such as downlink control information.

SUMMARY

Some aspects of this disclosure include apparatuses and methods for monitoring downlink control information, such as paging occasions, by a user equipment (UE). In some aspects, the UE monitors one or more paging occasions within a discontinuous repetition cycle (DRX). The UE can make a determination of one or more paging occasions within the DRX to not monitor. Each paging occasion may include a transmission by the network of downlink control information for one or more paging messages. Therefore, by making a coordinated determination of which paging occasions to skip or discontinue monitoring, the UE can improve power consumption while attaining improved latency in NR-U when increased paging occasions are monitored within a DRX.

According to some aspects, the UE defines a paging inactivity timer corresponding to a value associated with paging occasions to monitor. Then, while performing paging occasion monitoring within a discontinuous repetition cycle (DRX), a determination of whether to not monitor one or more given paging occasions can be based on the paging inactivity timer. The paging inactivity timer may represent a value associated with paging occasions such as of a duration period or number of occasions monitored. According to some aspects, the UE can discontinue monitoring the plurality of paging occasions based on the paging inactivity timer. In some aspects of these aspects, the UE can be configured to initialize the paging inactivity timer after receiving downlink control information that does not include an addressing indicator associated with the UE.

According to some aspects, the UE may receive from the network an indicator that includes configuration information for paging occasion monitoring behavior of the electronic device. The indicator can be provided using an information element transmitted with a paging message, and the information element may indicates whether additional paging occasions should be monitored.

According to some aspects, the UE can receive the indicator using higher layer signaling, such as Radio Resource Control (RRC) layer signaling. In some aspects, the indicator can represent an instruction for the electronic device to discontinue paging occasion monitoring within a DRX based on a detection of a transmission by a base station (BS) and a determination that a paging identifier message transmitted by the BS does not include an address associated with the electronic device. Some aspects include the UE detecting the transmission by the base station of a Demodulation Reference Signal (DMRS).

According to additional aspects, a UE can receive a control resource set (CORESET) configuration defining a mapping of physical resources in a bandwidth part (BWP). The BWP comprises a plurality of sub-bands. The UE can configure a base CORESET (B-CORESET) within a single sub-band of the plurality of sub-bands. The UE can then replicate the B-CORESET in one or more virtual CORE-SETs (V-CORESET). Each of the one or more V-CORE-SETs may be replicated in a corresponding one or more of the other sub-bands of the BWP. The UE can configure a plurality of search space sets (SS) associated with the B-CORESET and each V-CORESET for monitoring locations in the frequency domain across multiple LBT sub-bands to improve transmission of downlink control information. According to some aspects, the UE defines a frequency offset $O_i$, where i represents a number corresponding to a Listen Before Talk (LBT) sub-band within a serving cell, and each V-CORESET is mapped to a LBT sub-band based on Oi. According to some aspects, the UE receives, using higher layer signaling, a configuration of the frequency offset Oi for each corresponding sub-band and associates a search space corresponding to each B-CORE-SET or V-CORESET. Some aspects include the UE receiving the configuration of the frequency offset $O_i$ for each corresponding sub-band using Radio Resource Control (RRC) layer signaling. And, the UE can receive an indicator using bitmap signaling that provides information as to which LBT sub-bands are mapped for a CORESET configured by RRC signaling.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
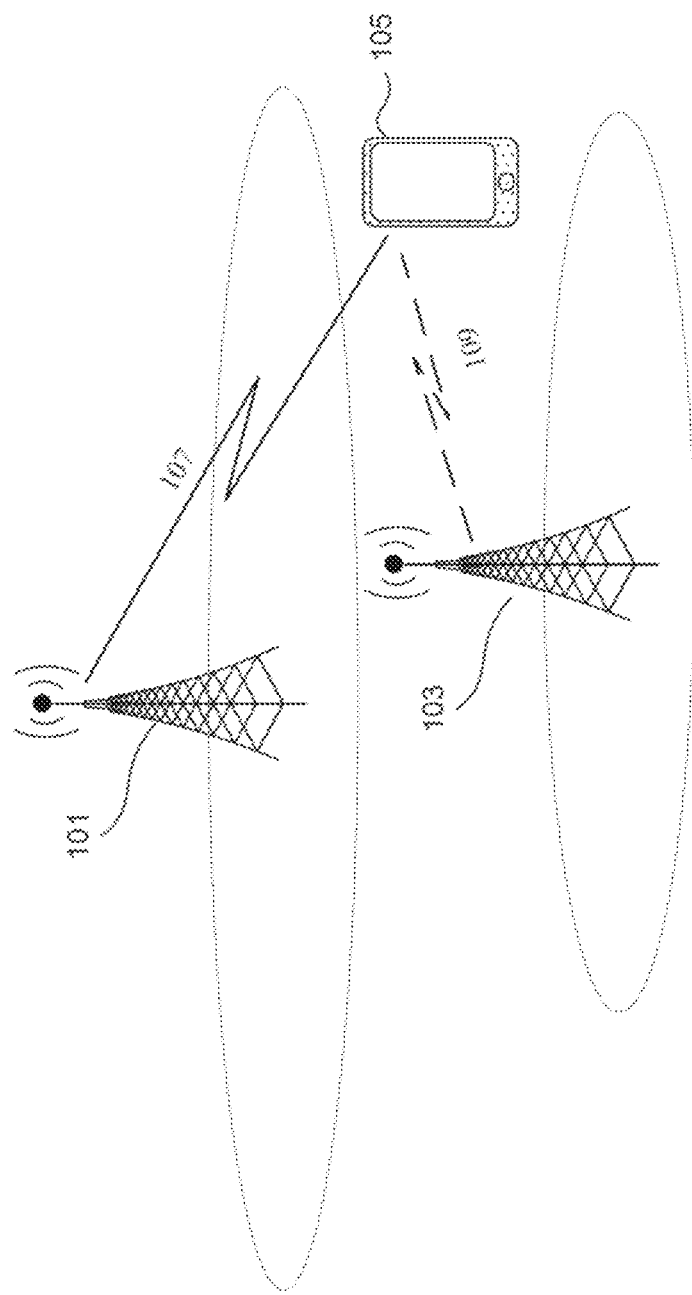
FIG. 1 illustrates an example system 100 implementing mechanisms for monitoring downlink control information, including augmenting monitoring paging occasions, between an electronic device and a network, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing mechanisms for augmenting downlink control channel paging occasion monitoring between an electronic device and a network.

A UE operating in new radio (NR) can be configured to utilize smaller bandwidths than the system bandwidth. The UE bandwidth within a carrier, configured by the base station (BS) as the number of contiguous PRBs with an associated subcarrier spacing (SCS), is called a bandwidth part (BWP). Once the BWP is activated, data and control channels are received/transmitted within the BWP. A UE can be configured with a plurality of BWPs, each BWP having different SCSs and may be mutually overlapping or non-overlapping in frequency. If more than one BWP is configured for a UE, the BS may select which BWP is active at a given time by means of downlink (DL) control. The physical downlink control channel (PDCCH) in NR carries Downlink Control Information (DCI).

Thus, the BS can dynamically configure the UE bandwidth according to the data traffic for the UE. A reduction in the UE bandwidth may reduce the UE power consumption. The physical downlink control channel (PDCCH) controls, for example, DL scheduling assignments, UL scheduling grants, and special purposes such as slot format indication, preemption indication, and power control. The DCI contains the scheduling information for the UL or DL data channels and other control information for one UE or a group of UEs. Operating in NR-U, DCI formats can include additional fields to transmit control information.

Control Resource Sets (CORESET) Within a Sub-Band

In NR-U, the BS (such as an eNB or gNB), monitors the wireless channel to determine whether it has the right to use the channel based on Listen Before Talk (LBT) mechanism. Once LBT grants for a sub-band, the BS can transmit (PDCCH, data, etc.) on the sub-band to UE(s). A DCI is mapped to physical resources in a given BWP, and necessary parameters (e.g., frequency and time domain resources, etc.) are configured to a UE by means of a control resource set (CORESET). A UE can be configured with more than one CORESET on each BWP on a serving cell. In one example, a UE can be configured with up to three CORESETs on each of four BWPs, for a total of twelve CORESETs on a serving cell. When a UE's BWP comprises multiple sub-bands (e.g., more than one 20 MHz sub-bands), puncturing (i.e., LBT failure for some of the BWP sub-bands) of PDCCH candidates can occur across the multiple sub-bands. In some aspects, the UE can be configured to receive PDCCH confined within a single LBT sub-band to reduce puncturing. Specifically, a NR-U CORESET can be configured within a sub-band that can be replicated in the sub-bands of the BWP, as if the same CORESET were separately configured. Doing so contributes to reducing complexity of handling additional CORESETs and configuration overhead. A single CORESET can be configured within a sub-band, and the associated search space sets (SS) can be configured with multiple monitoring locations in the frequency domain across multiple LBT sub-bands so as to increase the PDCCH transmission probability with LBT operation. According to some aspects, a UE can be configured such that one or more CORESETs are indexed according to their associated BWP. In some aspects, one or more CORESETs are active only when their associated BWP is active, with the exception of a CORESET associated with the initial BWP.

Some aspects describe power saving methods, systems and devices to reduce the UE's PDCCH monitoring operations are provided. A substantial amount of UE's power is consumed by the radio frequency (RF) chain and baseband (BB) processor due to the PDCCH monitoring without scheduled data. Aspects include PDCCH monitoring controls. Some aspects include an indicator (e.g., a power saving mode indicator) provided to control the UE's PDCCH monitoring behavior, for example, depending on the data traffic. In some aspects, the indicator enables the UE to dynamically control the UE's PDCCH monitoring behavior.

The indicator, such as of a power saving mode configuration, can be transferred by PDCCH of which the monitoring occasions are located before discontinuous reception (DRX) cycle. The power saving mode indicator can provide an indication of whether the UE skips one or more subsequent monitoring occasions within the DRX. Thus, the UE can be configured to monitor PDCCH only when there is scheduled data. Thereby, power consumption can be improved with minimal latency loss.

In NR, the UE performs blind decoding for a set of PDCCH candidates. PDCCH candidates to be monitored are configured for a UE by means of search space (SS) sets. There are two SS set types: common SS (CSS) set, which is commonly monitored by a group of UEs in the cell, and UE-specific SS (USS) set, which is monitored by an individual UE. A UE can be configured with a number of SS sets for each BWP in a serving cell (e.g., up to 10 SS sets each for up to four BWPs). SS set configuration can provide a UE with the SS set type (CSS set or USS set), DCI format(s) to be monitored, monitoring occasion, and the number of PDCCH candidates.

With respect to paging, a UE operating in NR, including NR-U, can be configured to monitor one paging occasion (PO) per DRX cycle. A PO is a set of PDCCH monitoring occasions that can include multiple time slots (e.g. subframe or OFDM symbol) where paging DCI can be sent. A Paging Frame (PF) can contain one or more PO(s) or starting point of a PO.

Increasing Paging Occasions

Upon LBT confirmation for a given sub-band, a BS (e.g., gNB) transmits information, such as PDCCH, to UE(s) on the sub-band. To avoid PDCCH candidate puncturing, confinement within a sub-band is enabled by an NR-U CORESET configuration.

The latency involved with paging transmission has direct bearing to the call connection latency. This becomes especially an important issue for the standalone system where PCell is on the unlicensed spectrum. If gNB could not transmit paging due to LBT, the paging transmission would have to be delayed to the next available occasion.

To address this, the number of PDCCH monitoring occasions can be increased during a DRX cycle. That is, the network increases opportunities to schedule the paging over a number of PDCCH monitoring occasions, for example a number of PDCCH monitoring occasions configurable by Radio Resource Control (RRC) signaling. In some non-limiting examples, a UE is associated with a number of POs that are consecutive or non-consecutive.

In between PDCCH monitoring occasions, the UE can be configured to defer monitoring in order to preserve power. The network is configured to ensure that the POs for 2 UE paging groups do not overlap. To further reduce power consumption by the UE in NR-U, the interval between monitored POs can be mitigated without substantially extending the delay for the UE to receive the page.

Managing UE Power Consumption

With an increase of PDCCH monitoring occasions, even more paging transmission opportunities for the base station (e.g., gNB) are provided, the UE encounters challenges in managing power consumption, especially if there is no paging transmission for the UE. A network and UE can be configured to assume the presence of a signal, such as (Demodulation Reference Signal (DMRS) in any transmission (such as PDCCH or GC-PDCCH), to detect transmission bursts by the serving gNB, to enable power saving.

For NR communication on unlicensed band (NR-U), one or more UE(s) can be configured to support multiple PDCCH monitoring occasions for paging within one DRX cycle. By doing so, timely paging delivery after LBT can be achieved by increasing paging transmission opportunities per DRX cycle.

However, as noted above, the increased PDCCH monitoring occasion can potentially leads to excessive UE power consumption. According to some aspects, UE can be configured to perform one or more PDCCH monitoring occasions, i.e., paging monitoring occasions, and skip or drop one or more PDCCH monitoring occasions to enable paging delivery with improved UE power consumption during PDCCH monitoring. As discussed in detail below, PDCCH monitoring occasions can be coordinated between a BS and one or more UE(s) to minimize paging delivery latency when UE power consumption is improved.

Timer-Based PDCCH Monitoring

According to some aspects, a paging inactivity timer (e.g., "paging_InactivityTimer") can be defined to limit PDCCH PO monitoring without substantially affecting latency. For example, paging_InactivityTimer may be defined to represent the duration or number of monitoring occasions for PDCCH candidates for a DCI format 1_0 with cyclic redundancy check (CRC) scrambled with a Paging Radio Network Temporary Identifier (P-RNTI) after the PDCCH occasion in which a PDCCH indicates a paging message transmission.

In some examples, the value of paging_InactivityTimer may be configured by a system information block or dedicated RRC message for a given UE.

In some aspects, the UE may stop monitoring additional paging PDCCH occasions in the DRX cycle if the UE detects a P-RNTI in a DRX cycle addressed to it. In other aspects, UE can be configured to stop monitoring addition paging PDCCH POs in the DRX cycle as long as the UE detects the PDCCH with P-RNTI. For example, the UE may be configured to stop monitoring additional POs if the UE detects the PDCCH with P-RNTI regardless of whether the paging message is addressed to the UE ID of the given UE determined by the International Mobile Subscriber Identity (IMSI).

In some aspects, the UE may start or restart paging_InactivityTimer after the end of the PDCCH reception. For example, if the BS accesses channels based on the detection of PDCCH or other DL signals (e.g. PBCH, SS blocks, DRS), the UE may detect activity and restart the paging_InactivityTimer when the UE does not detect P-RNTI addressed to the UE. Thus, additional opportunities for paging transmission can be efficiently provided to ensure the paging message delivery.

Figure 4:
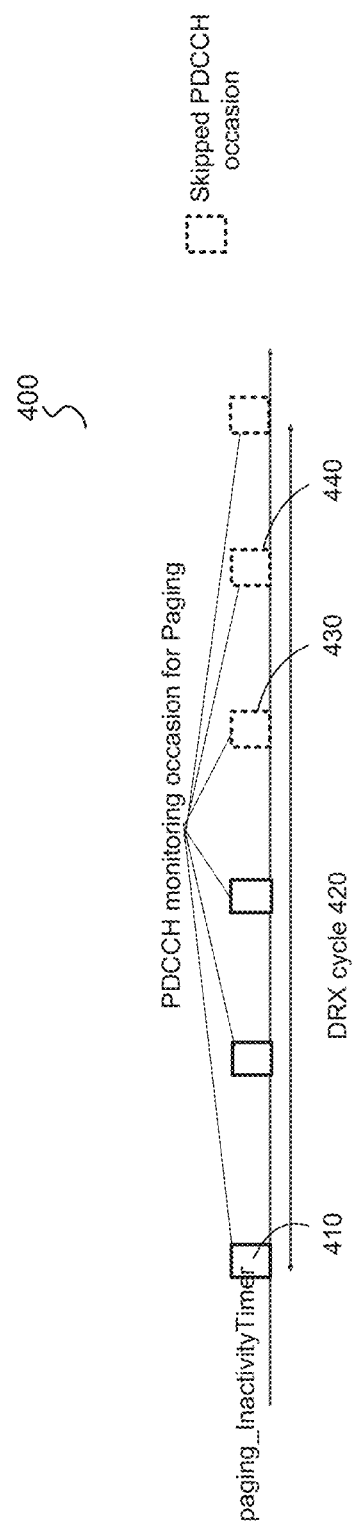
FIG. 4 depicts exemplary paging occasion skipping in a discontinuous repetition cycle, according to some aspects of the disclosure.

Further, if a paging_InactivityTimer expires, UE stops the PDCCH monitoring for paging in the DRX cycle. As shown in FIG. 4, an example of timer-based PDCCH monitoring configuration 400 is provided. The example configuration shown in FIG. 4 assumes, but is not limited to, five paging monitoring occasions configured within a DRX cycle. Further, the example is illustrated with, but not limited to, a value of paging_InactivityTimer provided as two (i.e., monitor two paging occasions after which monitoring is discontinued within the DRX). If a UE (e.g., UE 105 in FIG. 1) detects downlink control information that includes paging message information (e.g., PDCCH with an encrypted P-RNTI signal), even if it is not addressed the UE will start the paging_InactivityTimer. In this example, the UE starts the paging_InactivityTimer from PDCCH monitoring occasion 410. UE will stop monitoring PDCCH occasions 430 and 440 for paging within DRX cycle 420 as paging_InactivityTimer expires starting from 430. In some aspects, physical signaling can be configured to allow the UE to stop monitoring the additional PDCCH occasions according to one or more exemplary processes.

According to one example, the presence of a signal, such as the DMRS in any PDCCH or GC-PDCCH transmission to detect the transmission bursts by the gNB. More specifically, DMRS may be a wide-band DMRS and group common PDCCH (GC-PDCCH) carries the channel occupancy time (COT) information in time or frequency domain.

According to another example, depending on the RRC states, different channels can be used to provide the indicator with respect to dropping one or more paging monitoring occasion. For example, for UEs in idle mode (RRC IDLE UEs) the PDCCH transmission addressed to SI-RNTI or SSB, or PDSCH carrying Remaining Minimum System Information (RMSI)/Other System Information (OSI) can be used to indicate PO skipping. For UEs in a connected mode (e.g., RRC CONNECTED state), any scheduled PDSCH/PDCCH transmission or Channel State Information Reference Signal (CSI-RS), transmission can be used as a field for the indicator. In some designs, to ensure the detection reliability of CSI-RS signal, certain restrictions on the resource element (RE) density within a resource block (RB) may be specified. For example, 3 REs/per RB configuration of CSI-RS, such as a tracking reference signal (TRS).

According to other aspects, the UE can be configured to receive an information element (IE) that is added to a paging message. The IE to indicate whether the UE is to enter a skip paging monitoring (i.e. a power saving) mode. As noted above, in the power saving mode, the additional paging occasions for PDCCH monitoring within the same DRX cycle can be skipped by the UE.

For example, an abstract symbol notation (ASN.1) specification can be provided to define an IE("SkipPagingMonitoring") as follows:

| Paging ::= | SEQUENCE. { |
|---|---|
| pagingRecordList | |
| lateNonCriticalExtension | OCTET STRING |
| SkipPagingMonitoring. | BOOLEAN |
| nonCriticalExtension | SEQEUNCE{ }} |

According to additional aspects, the network may configure the UE as to whether or not to stop monitoring additional PDCCH monitoring occasions within a DRX cycle after detecting of P-RNTI without addressing to UE.

Figure 5:
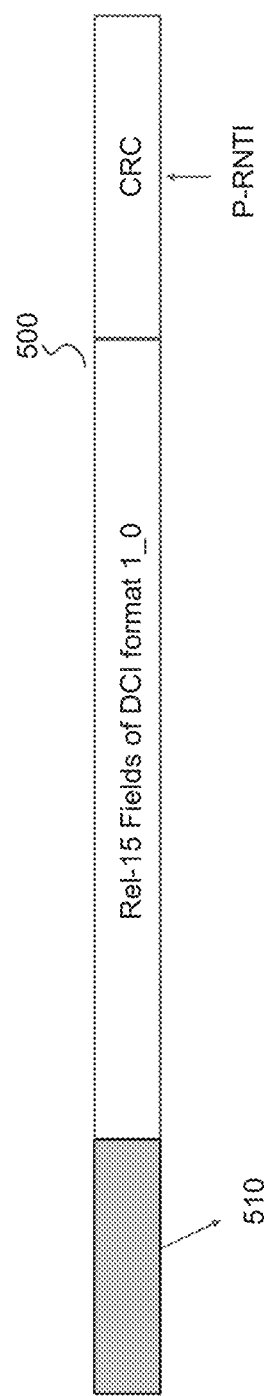
FIG. 5 illustrates a downlink control information format that is configured to add an information field representing a skipping indicator, according to some aspects of the disclosure.

According to additional aspects, an information field can be added to DCI formats to indicate whether the PDCCH monitoring occasions in the same DRX cycle can be skipped. As shown in FIG. 5, a DCI format 500 can be provided based on DCI format 1_0. In this example, the DCI 500 is configured to add an information field 510 to DCI format 1_0, the information field 510 representing a PDCCH skipping indicator. Further, as shown, DCI 500 includes CRC encrypted by P-RNTI. In other non-limiting examples (not shown), one or more 'reserved' bits of a Rel-15 DCI format 1_0 may be re-interpreted as the indicator, i.e., to indicate skipping or discontinuing additional PDCCH monitoring occasion for paging in a same DRX cycle.

Search Space Configuration for PDCCH Monitoring on CC with Multiple LBT Sub-Bands As noted above, some aspects include a single CORESET configured within a sub-band. According to some aspects, the associated search space sets (SS) can be configured with multiple monitoring locations in the frequency domain across multiple LBT sub-bands. By configuring for multiple monitoring locations, the PDCCH transmission probability can be increased during LBT operation.

Figure 6:
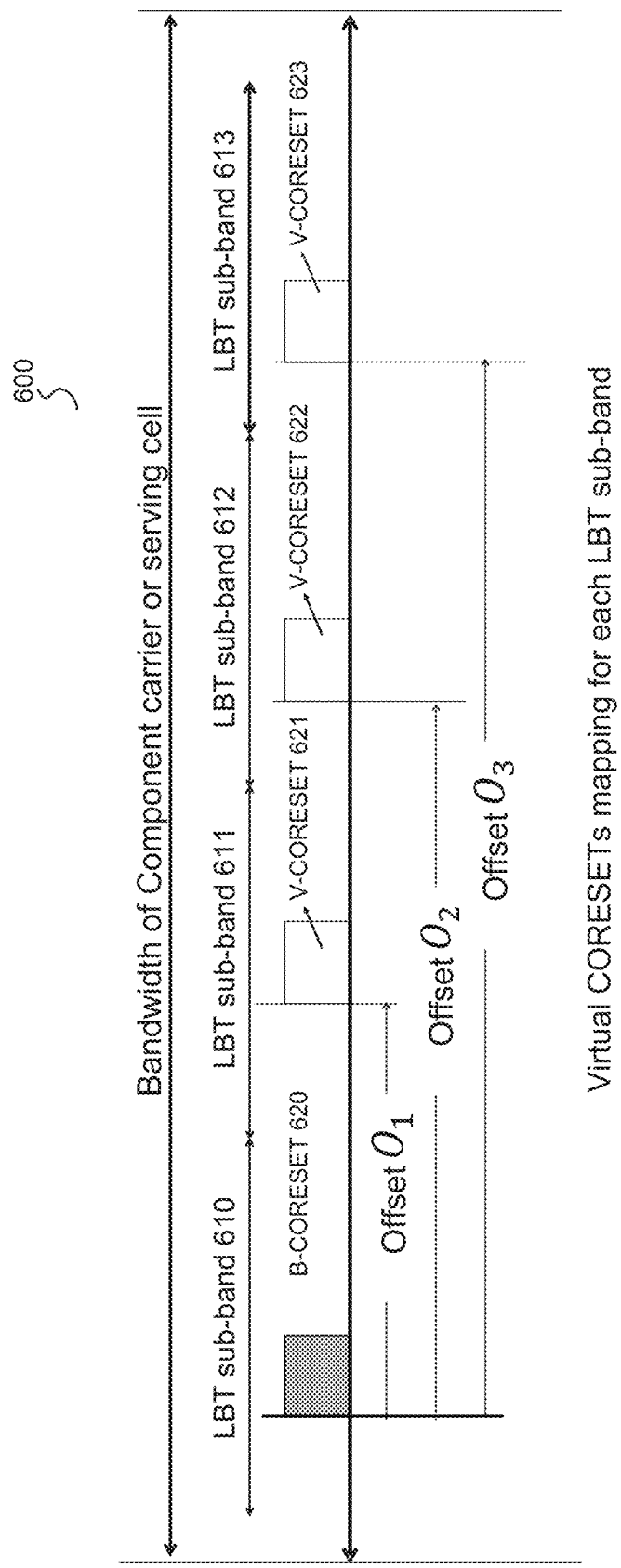
FIG. 6 illustrates a virtual CORESET mapping for Listen Before Talk sub-bands, according to some aspects of the disclosure.

As shown in FIG. 6, according to some aspects, for a serving cell with carrier bandwidth greater than LBT bandwidth, a base CORESET (B-CORESET 620) and one or more virtual CORESETs (V-CORESET) 621, 622, or 623 can be mapped within every respective LBT sub-band 610, 611, 612, or 613 based on a frequency offset. From a signaling perspective, only the B-CORESET is configured while the V-CORESETs (e.g., three V-CORESETs) are replicated from the B-CORESET. That is, the V-CORESETs are propagated by the UE by replicating the configured B-CORESET. In one non-limiting example, a frequency offset $O_i$ can be mapped between a base CORSET (B-CORESET) and the lowest physical resource block (PRB) of the V-CORESET i. In this example, i represents the number of the LBT sub-band within the serving cell.

As shown in FIG. 6, one or more frequency offsets $O_i$ in resource block (RB) units can be configured by higher layer signaling. In one non-limiting example, the frequency offset $O_i$ can be configured by RRC signaling on a per sub-band basis. A search space may be associated with B-CORESET 620 or one or more V-CORESETs 621 to 623, which is configured as part of search space configuration. According to other aspects, a bitmap signaling can be used to indicate which of LBT sub-bands are mapped for a CORESET configured by RRC signaling.

FIG. 1 illustrates an example system 100 implementing mechanisms for downlink control channel PO monitoring between an electronic device and a network for carrier/cell detection and measurement, according to some aspects of the disclosure. Example system 100 is provided for the purpose of illustration only and does not limit the disclosed aspects. System 100 may include, but is not limited to, network nodes (for example, base stations such as eNBs) 101 and 103 and electronic device (for example, a UE) 105. Electronic device 105 (hereinafter referred to as UE 105) can include an electronic device configured to operate based on a wide variety of wireless communication techniques. These techniques can include, but are not limited to, techniques based on 3rd Generation Partnership Project (3GPP) standards. For example, UE 105 can include an electronic device configured to operate using Release 17 (Rel-17) or later. UE 105 can include, but is not limited to, as wireless communication devices, smart phones, laptops, desktops, tablets, personal assistants, monitors, televisions, wearable devices, Internet of Things (IoTs), vehicle's communication devices, and the like. Network nodes 101 and 103 (herein referred to as base stations) can include nodes configured to operate based on a wide variety of wireless communication techniques such as, but not limited to, techniques based on 3GPP standards. For example, base stations 103 and 105 can include nodes configured to operate using Release 17 (Rel-17) or later.

According to some aspects, UE 105 and base stations 101 and 103 are configured to implement mechanisms for downlink control channel PO monitoring between UE 101 and a network associated with base stations 101 and 103 for carrier/cell detection and measurement. For example, UE 105 can be connected to and can be communicating with base station 101 using carrier 107. According to some aspects, carrier 107 can include one carrier. Additionally, or alternatively, carrier 107 can include two or more component carriers (CC). In other words, UE 105 can implement carrier aggregation (CA). For example, UE can use multiple carriers for communication with base station 101. In some examples, the UE can use a primary component carrier (PCC) with one or more secondary component carriers (SCC). The carriers can be used using Frequency Division Duplex (FDD), Time Division Duplex, or a mix of TDD and FDD. In some examples, the PCC can be used for control signaling and SCC(s) can be used for data. However, the aspects of this disclosure are not limited to these examples.

According to some aspects, UE 105 is configured to coordinate downlink control channel PO monitoring with base station 101 and/or the network associated with base station 101 (and/or 103). For example, before or during a process of communicating with base station 101, UE 105 can define a paging inactivity timer to augment or limit PDCCH monitoring. For example, and as described above, UE 105 can define paging_InactivityTimer to represent the duration or number of monitoring occasions for PDCCH candidates. In some aspects, UE 105 can define paging_InactivityTimer based on a DCI format 1_0 with CRC scrambled with P-RNTI after the PDCCH occasion in which a PDCCH indicates a paging message transmission. In some examples, the value of paging_InactivityTimer may be configured by a system information block or dedicated RRC message for a given UE.

In some aspects, UE 105 may stop monitoring additional paging PDCCH occasions in the DRX cycle if the UE detects a P-RNTI in a DRX cycle addressed to it. In other aspects, UE 105 can be configured to stop monitoring addition paging PDCCH POs in the DRX cycle only if the UE detects the PDCCH with P-RNTI. For example, the UE may be configured to stop monitoring additional POs if the UE detects the PDCCH with a signal encrypted with P-RNTI whether or not the paging message is addressed to the universal unique identifier (UUID) of the given UE.

In some aspects, the UE may start or restart paging_InactivityTimer after the end of the PDCCH reception. For example, if the BS accesses channels based on PDCCH or other DL signals (e.g. PBCH, SS blocks, DRS), the UE may detect activity and restart the paging_InactivityTimer when the UE does not detect P-RNTI addressed to the UE. Thus, additional opportunities for paging transmission can be efficiently provided.

Further, if a paging_InactivityTimer expires, UE 105 stops the PDCCH monitoring for paging in the DRX cycle. As shown in FIG. 4, UE 105 will start the paging_InactivityTimer from PDCCH monitoring occasion 410 once UE 105 detects PDCCH including a signal encrypted with P-RNTI even it does not address UE 105 will stop monitoring PDCCH occasions 430 and 440 for paging within DRX cycle 420 as paging_InactivityTimer expires starting from 430.

In some aspects, physical signaling can be configured to allow UE 105 to stop monitoring the additional PDCCH occasions according to one or more exemplary processes.

According to one example, the presence of a signal, such as the DMRS in any PDCCH or GC-PDCCH transmission, enables UE 105 to detect the transmission bursts by the gNB. More specifically, DMRS may be a wide-band DMRS and group common PDCCH (GC-PDCCH) carries the channel occupancy time (COT) information in time or frequency domain.

According to another example, depending on the RRC states, different channels can be used to provide the indicator with respect to drop one or more paging monitoring occasion. For example, for UEs in idle mode (RRC IDLE UEs) the PDCCH transmission addressed to SI-RNTI or SSB, or PDSCH carrying Remaining Minimum System Information (RMSI)/Other System Information (OSI) can be used to indicate PO skipping. For UEs in a connected mode (e.g., RRC CONNECTED state), any scheduled PDSCH/PDCCH transmission or Channel State Information Reference Signal (CSI-RS), transmission can be used as a field for the indicator. In some designs, to ensure the detection reliability of CSI-RS signal, certain restriction on the resource element (RE) density within a resource block (RB) may be specified. For example, 3 REs/per RB configuration of CSI-RS, such as a tracking reference signal (TRS).

According to other aspects, the UE can be configured to receive an information element (IE) that is added to a paging message. The IE to indicate whether the UE is to enter a skip paging monitoring (i.e. a power saving) mode. As noted above, in the power saving mode, the additional paging occasions for PDCCH monitoring within the same DRX cycle can be skipped by the UE.

For example, an abstract symbol notation (ASN.1) specification can be provided to define an IE("SkipPagingMonitoring") as follows:

| Paging ::= | SEQUENCE. { |
|---|---|
| pagingRecordList | |
| lateNonCriticalExtension | OCTET STRING |
| SkipPagingMonitoring. | BOOLEAN |
| nonCriticalExtension | SEQEUNCE{ }} |

According to additional aspects, the network can configure the UE whether or not to stop monitoring additional PDCCH monitoring occasions within a DRX cycle after detecting of P-RNTI without addressing to UE.

According to additional aspects, a new information field may be added to DCI formats to indicate whether the PDCCH monitoring occasions in the same DRX cycle can be skipped. As shown in FIG. 5, one non-limiting example adds an information field 510 to DCI format 1_0 with CRC scrambled by P-RNTI. In other non-limiting examples, part of 'reserved' bits of Rel-15 DCI format 1-0 can be re-interpreted to indicate the skipping of additional PDCCH monitoring occasion for paging in a same DRX cycle.

Figure 2:
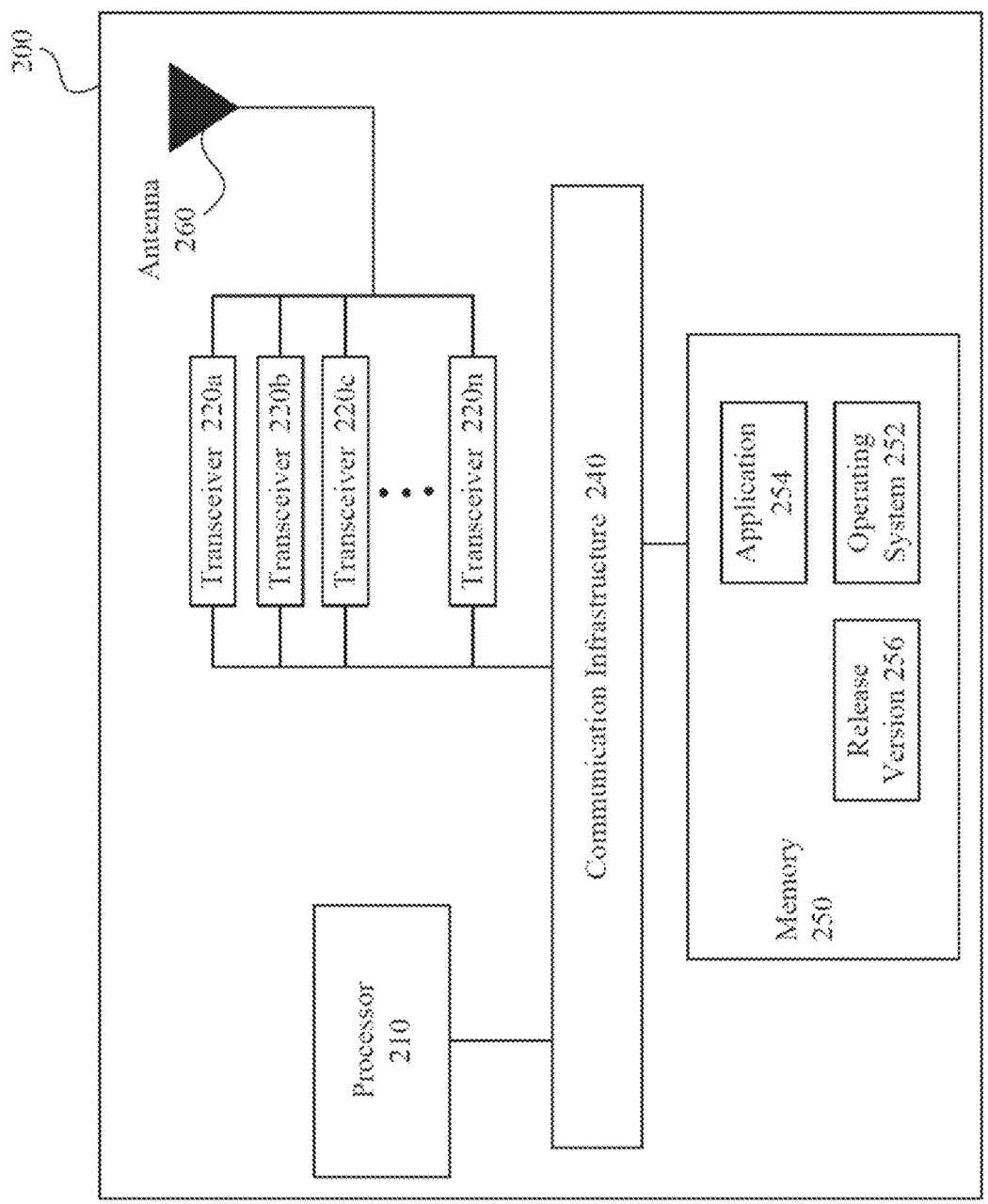
FIG. 2 illustrates a block diagram of an example system of an electronic device implementing mechanisms for monitoring downlink control information, including augmenting monitoring paging occasions, according to some aspects of the disclosure.
Figure 3:
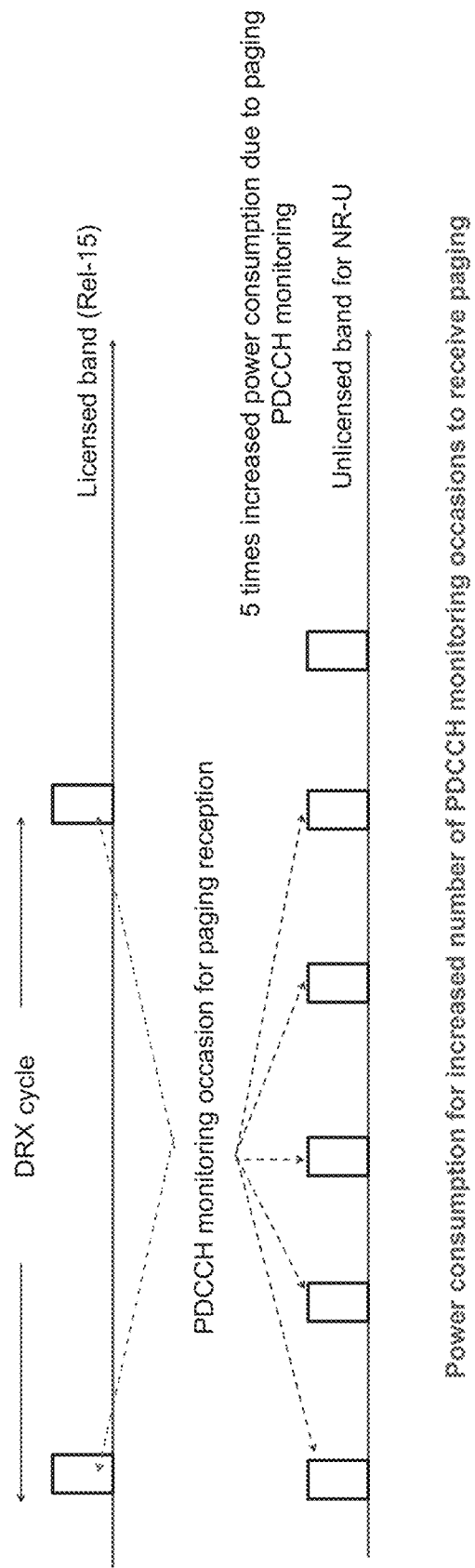
FIG. 3 depicts increased number of paging occasion monitoring within a discontinuous repetition cycle contributing to increased UE power consumption.

FIG. 2 illustrates a block diagram of an example system 200 of an electronic device implementing mechanisms for monitoring downlink control information, including monitoring paging occasions, according to some aspects of the disclosure. System 200 may be any of the electronic devices (e.g., base stations 101, 103, UE 105) of system 100. System 200 includes processor 210, one or more transceivers 220a-220n, communication infrastructure 240, memory 250, operating system 252, application 254, and antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220a-220n. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

System 200 can also include communication infrastructure 240. Communication infrastructure 240 provides communication between, for example, processor 210, one or more transceivers 220a-220n, and memory 250. In some implementations, communication infrastructure 240 may be a bus. Processor 210 together with instructions stored in memory 250 performs operations enabling system 200 of system 100 to implement mechanisms for monitoring downlink control information, including monitoring paging occasions as described herein. Additionally, or alternatively, one or more transceivers 220a-220n perform operations enabling system 200 of system 100 to implement mechanisms for monitoring downlink control information, including monitoring paging occasions, as described herein.

One or more transceivers 220a-220n transmit and receive communications signals that support mechanisms for monitoring downlink control information, including monitoring paging occasions, according to some aspects, and may be coupled to antenna 260. Antenna 260 may include one or more antennas that may be the same or different types. One or more transceivers 220a-220n allow system 200 to communicate with other devices that may be wired and/or wireless. In some examples, one or more transceivers 220a-220n can include processors, controllers, radios, sockets, plugs, buffers, and like circuits/devices used for connecting to and communication on networks. According to some examples, one or more transceivers 220a-220n include one or more circuits to connect to and communicate on wired and/or wireless networks.

According to some aspects of this disclosure, one or more transceivers 220a-220n can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220a-220n can include more or fewer systems for communicating with other devices.

In some examples, one or more transceivers 220a-220n can include one or more circuits (including a WLAN transceiver) to enable connection(s) and communication over WLAN networks such as, but not limited to, networks based on standards described in IEEE 802.11.

Additionally, or alternatively, one or more transceivers 220a-220n can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, one or more transceivers 220a-220n can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220a-220n can be configured to operate according to one or more of Rel-15, Rel-16, Rel-17, or later of 3GPP standard.

According to some aspects of this disclosure, processor 210, alone or in combination with computer instructions stored within memory 250, and/or one or more transceiver 220a-220n, implements the paging occasions monitoring discussed herein. For example, transceiver 220a can enable connection(s) and communication over a first carrier (for example, carrier 107 of FIG. 1). In this example, transceiver 220b can enable detecting and/or measuring a second carrier (for example, carrier 109 of FIG. 1), transceiver 220c can enable detecting and/or measuring a third carrier, and transceiver 220n can enable detecting and/or measuring a fourth carrier, concurrently. As discussed above, the first, second, third, and fourth carriers can be associated to same or different base stations.

Additionally, or alternatively, wireless system 200 can include one transceiver configured to operate at different carriers. Processor 210 can be configured to control the one transceiver to switch between different carriers, according to some examples.

According to some aspects of this disclosure, processor 210, alone or in combination with computer instructions stored within memory 250, and/or one or more transceiver 220a-220n, implements mechanisms for monitoring downlink control information, including monitoring paging occasions, as described herein. Although the operations discussed herein are discussed with respect to processor 210, it is noted that processor 210, alone or in combination with computer instructions stored within memory 250, and/or one or more transceiver 220a-220n, can implement these operations. For example, processor 210 is configured to monitor paging occasions of system 200 from a base station (and/or a network associated with the base station) as a per-UE capability, during an initial communication discussed above (or any other initial access). Processor 210 can use a RRC layer signaling, a MAC layer, and/or a PHY layer signaling to for configure paging occasions monitoring as a per-UE capability.

In another example, processor 210 can be configured to monitor paging occasions of system 200 from a base station (and/or a network associated with the base station) as a per-FR capability, during an initial communication discussed above (or any other initial access). Processor 210 can use a RRC layer signaling, a MAC layer, and/or a PHY layer signaling to configure paging occasions monitoring as a per-FR capability.

In some examples, processor 210 can be configured for monitoring paging occasions of the base station (and/or the network associated with base station) using system 200's release version. For example, release version 256 stored in, for example, memory 250 can be indicative of whether system 200 is configured to operate at one or more of Rel-16, Rel-15, or earlier and/or Rel-17 or later. Processor 210 can generate and transmit a signal including/indicating release version 256. In these examples, base station (and/or the network associated with base station) can configure paging occasions monitoring associated with system 200 based on the release version 256.

Figure 7:
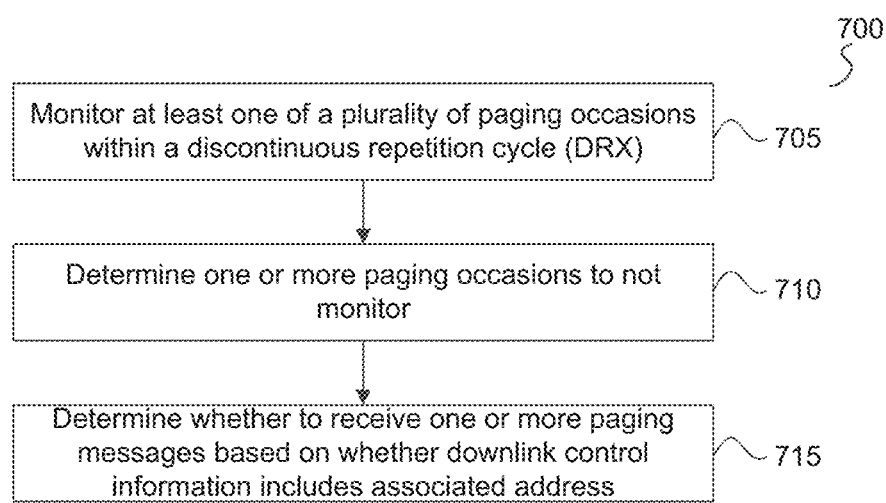
FIGS. 7 and 8 illustrate an example method for a system (for example a user equipment (UE)) supporting mechanisms for monitoring downlink control information, including monitoring paging occasions, according to some aspects of the disclosure.
Figure 8:
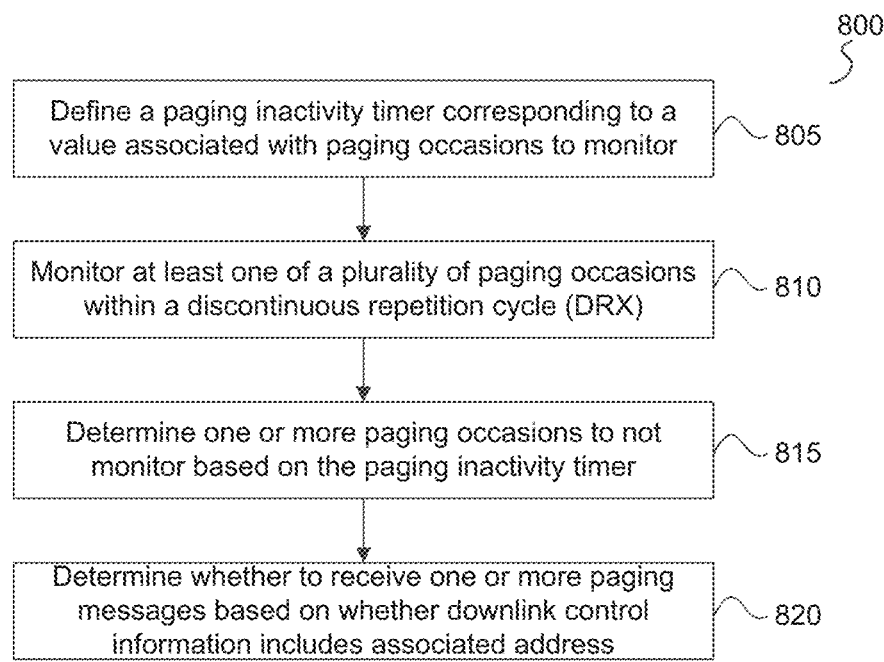

As discussed in more detail below with respect to FIGS. 7 and 8, processor 210 can implement different mechanisms for monitoring downlink control information in system 100 of FIG. 1. FIG. 7 illustrates an example method 700 for a system (for example a user equipment (UE)) supporting mechanisms for monitoring downlink control information, according to some aspects of the disclosure. As a convenience and not a limitation, FIGS. 7, 8, and 9 may be described with regard to elements of FIGS. 1, and 2, and 10. As shown in FIG. 7, method 700 may represent the operation of an electronic device (for example, UE 105 of FIG. 1) implementing mechanisms for monitoring downlink control information. Method 700 may also be performed by system 200 of FIG. 2 and/or computer system 1000 of FIG. 10. But method 700 is not limited to the specific aspects depicted in those figures and other systems may be used to perform the method as will be understood by those skilled in the art. It is to be appreciated that not all operations may be needed, and the operations may not be performed in the same order as shown in FIG. 7.

At 705, at least one of a plurality of paging occasions within a discontinuous repetition cycle (DRX) is monitored, for example, by a UE receiving communications from a network. For example, a UE (for example, UE 105) can be configured to listen to one or more paging occasions within the DRX. For example, the UE 105 is configured to monitor PDCCH for the presence of a signal containing a paging message, such as a signal encrypted by P-RNTI. UE 105 may continue monitoring paging messages. In NR-U, UE 105 can be configured to support multiple PDCCH monitoring occasions for paging within the DRX cycle. Increasing paging transmission opportunities per DRX cycle improves the timeliness of paging delivery in LBT communications but potentially leads to excessive UE power consumption. According to some aspects, monitoring paging occasions at 705 includes monitoring PDCCH communications.

At 710, the UE determines not to monitor one or more of the plurality of paging occasions within the same DRX as discussed in 710. The paging occasions can include an opportunity for a transmission, by the network, of downlink control information for paging messages to one or more UEs. That is, the UE 105 performs one or more paging monitoring occasions at 705, and skips or disregards one or more PDCCH monitoring occasions at 710. Thus, UE 105 can achieve timely paging delivery with improved UE power consumption by skipping one more paging occasions. As discussed in detail below, PDCCH monitoring occasions can be coordinated between a BS and one or more UE(s) to minimize paging delivery latency when UE power consumption is improved. Some aspects include using physical signaling such as higher layer signaling to configure the UE to stop monitoring the additional PDCCH occasions. In one example, the UE detects the transmission bursts by the gNB by listening for the presence of a signal, such as the DMRS in any PDCCH or GC-PDCCH transmission. More specifically, DMRS may be a wide-band DMRS and group common PDCCH (GC-PDCCH) carries the channel occupancy time (COT) information in time or frequency domain.

According to another example, depending on the RRC states, different channels can be used to provide the indicator with respect to drop one or more paging monitoring occasion. For example, for UEs in idle mode (RRC IDLE UEs) the PDCCH transmission addressed to SI-RNTI or SSB, or PDSCH carrying Remaining Minimum System Information (RMSI)/Other System Information (OSI) can be used to indicate PO skipping. For UEs in a connected mode (e.g., RRC CONNECTED state), any scheduled PDSCH/PDCCH transmission or Channel State Information Reference Signal (CSI-RS), transmission can be used as a field for the indicator. In some designs, to ensure the detection reliability of CSI-RS signal, certain restriction on the resource element (RE) density within a resource block (RB) may be specified. For example, 3 REs/per RB configuration of CSI-RS, such as a tracking reference signal (TRS).

According to other aspects, UE 105 can be configured to receive an information element (IE) that is added to a paging message. The IE to indicate whether UE 105 is to enter a skip paging monitoring (i.e. a power saving) mode. As noted above, in the power saving mode, the additional paging occasions for PDCCH monitoring within the same DRX cycle can be skipped by the UE. One example is provided above with respect to the "SkipPagingMonitoring" IE.

According to additional aspects, UE 105 can be configured by the network to determine whether to stop monitoring additional PDCCH monitoring occasions within a DRX cycle after detecting of P-RNTI without addressing UE 105.

According to additional aspects, a new information field may be added to DCI formats to indicate whether the PDCCH monitoring occasions in the same DRX cycle can be skipped. As shown in FIG. 5, one non-limiting example adds an information field 510 to DCI format 1_0 with CRC scrambled by P-RNTI. In other non-limiting examples, part of 'reserved' bits of Rel-15 DCI format 1-0 may be re-interpreted to indicate the skipping of additional PDCCH monitoring occasion for paging in a same DRX cycle.

At 715, the UE can use downlink control information in deciding whether to receive one or more paging messages. For example, if the downlink control information includes an address associated with the UE, then UE 105 processes the paging message. Otherwise, UE 105 can drop the downlink control information and proceed with either operation 705 or 710.

According to some aspects, processor 210 can implement processes for monitoring downlink control information that includes reliance on a timer, counter, or other means for enumerating paging occasions or duration. FIG. 8 illustrates an example method 800 for a system (for example a user equipment (UE)) supporting mechanisms for monitoring downlink control information, including monitoring paging occasions, according to some aspects of the disclosure. As a convenience and not a limitation, FIG. 8 may be described with regard to elements of FIGS. 1, and 2, and 10. Method 800 may represent the operation of an electronic device (for example, UE 105 of FIG. 1) implementing mechanisms for monitoring downlink control information, including monitoring paging occasions. The above disclosure of method 700 applies to method 800.

At 805, a paging inactivity timer (e.g., "paging_InactivityTimer") is defined to correspond to a value. The paging inactivity timer value may correspond to a duration of paging occasions, for example. In another example, the paging inactivity timer value can correspond to a number of paging occasions (e.g., a number of paging occasions to be monitored within a current DRX).

At 810, at least one of a plurality of paging occasions within a discontinuous repetition cycle (DRX) is monitored, for example by a UE receiving communications from a network. For example, a UE (for example, UE 105) can be configured to listen to one or more paging occasions within the DRX. For example, the UE 105 is configured to monitor PDCCH for the presence of a signal containing a paging message, such as a signal encrypted by P-RNTI. UE 105 may continue monitoring paging messages. In NR-U, UE 105 can be configured to support multiple PDCCH monitoring occasions for paging within the DRX cycle. Increasing paging transmission opportunities per DRX cycle improves the timeliness of paging delivery in LBT communications but potentially leads to excessive UE power consumption. According to some aspects, monitoring paging occasions at 705 includes monitoring PDCCH communications. According to some aspects, if paging_InactivityTimer expires, UE 105 stops the monitoring paging occasions in the DRX cycle. For example, as shown in FIG. 4, an example of timer-based PDCCH monitoring adaptation assuming five paging monitoring occasions are configured within a DRX cycle and value of paging_InactivityTimer is two.

UE 105 will start the paging_InactivityTimer from PDCCH monitoring occasion 410 once UE 105 detects downlink control information associated with paging message (e.g., PDCCH that includes P-RNTI encryption), even if not addressed to UE 105. In this non-limiting example, UE 105 does not monitor paging occasions 430 and 440 within DRX cycle 420. Some aspects of the invention include configuring the paging inactivity timer may by a system information block or dedicated RRC message for UE 105.

At 815, UE 105 determines not to monitor one or more of the plurality of paging occasions within the same DRX based on the paging inactivity timer. For example, if paging inactivity timer increments a time or count of monitored paging occasions and reaches a limit value, UE 105 can be configured to discontinue monitor paging occasions within the DRX. Additionally or alternatively, UE 105 can be configured to stop monitoring additional paging PDCCH occasions in the DRX cycle if the UE detects a P-RNTI in a DRX cycle addressed to it. As with method 700, the UE 105 performs one or more paging monitoring occasions at 710, and skips or disregards one or more PDCCH monitoring occasions at 815 to improve UE power consumption.

In some aspects, UE 105 may start or restart the paging inactivity timer after receiving downlink control information, e.g., after the end of PDCCH reception. For example, if the BS accesses channels based on PDCCH or other DL signals (e.g. PBCH, SS blocks, DRS), UE 105 may detect activity and restart the paging_InactivityTimer when the UE does not detect P-RNTI addressed to the UE.

At 820, UE 105 can use downlink control information in deciding whether to receive one or more paging messages. For example, if the downlink control information includes an address associated with the UE, then UE 105 processes the paging message. Otherwise, UE 105 can drop the downlink control information and proceed with either operation 705 or 710.

Figure 9:
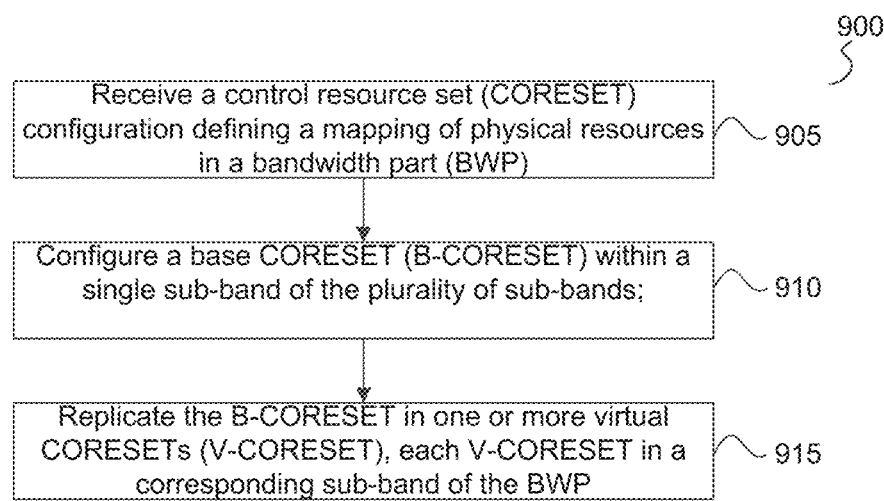
FIG. 9 illustrates an example method for a system (for example a base station) supporting mechanisms for replicating virtual CORESETs for Listen Before Talk sub-bands, according to some aspects of the disclosure.

Further, as discussed in more detail below with respect to FIG. 9, processor 210 can also implement different mechanisms for configuring and propagating NR-U CORESETs within a sub-band (i.e., a single sub-band of a BWP) that can be replicated in other sub-bands of the BWP, as if the same CORESET were separately configured. FIG. 9 illustrates an example method 900 for a system (for example a user equipment (UE)) supporting mechanisms for replicating a B-CORESET to one or more V-CORESETS, according to some aspects of the disclosure. Without limitation, FIG. 9 may be described with regard to elements of FIGS. 1, and 2, and 10. Method 900 may represent the operation of an electronic device (for example, UE 105 of FIG. 1) implementing mechanisms for configuring CORESETs, including V-CORESETs by the electronic device. Method 900 may also be performed by system 200 of FIG. 2 and/or computer system 1000 of FIG. 10. But method 900 is not limited to the specific aspects depicted in those figures and other systems may be used to perform the method as will be understood by those skilled in the art. It is to be appreciated that not all operations may be needed, and the operations may not be performed in the same order as shown in FIG. 9.

At 905, UE 105 receives a control resource set (CORESET) configuration defining a mapping of physical resources in a bandwidth part (BWP), wherein the BWP comprises a plurality of sub-bands (i.e., LBT sub-bands).

At 910, UE 105 configures a base CORESET (B-CORESET) within a single sub-band (e.g., LBT sub-band) of the plurality of sub-bands based on the CORESET configuration received by the UE.

At 915, UE 105 replicates the B-CORESET in one or more virtual CORESETs (V-CORESET). Each of the one or more V-CORESETs can be replicated in a corresponding one or more sub-bands (e.g., the other sub-bands) of the BWP. A plurality of search space sets (SS) associated with the B-CORESET and each V-CORESET can be configured for a plurality of monitoring locations in the frequency domain across multiple LBT sub-bands to increase a probability of downlink control information. According to some aspects, UE 105 defines a frequency offset $O_i$, for each V-CORESET, where i represents a number corresponding to a (LBT) sub-band within a serving cell. Each V-CORESET is mapped to a sub-band, such as each LBT sub-band, based on $O_i$. Some aspects of the include UE 105 receiving, by higher layer signaling, a configuration of the frequency offset $O_i$ for each corresponding LBT sub-band, and associating a search space corresponding to each B-CORESET or V-CORESET.

For example, UE 105 can receive a configuration of the frequency offset $O_i$ for each corresponding sub-band using Radio Resource Control (RRC) layer signaling from the network. Additionally, UE 105 can receive bitmap signaling that includes an indicator comprising information as to which LBT sub-bands are mapped for a CORESET configured by the RRC signaling.

Figure 10:
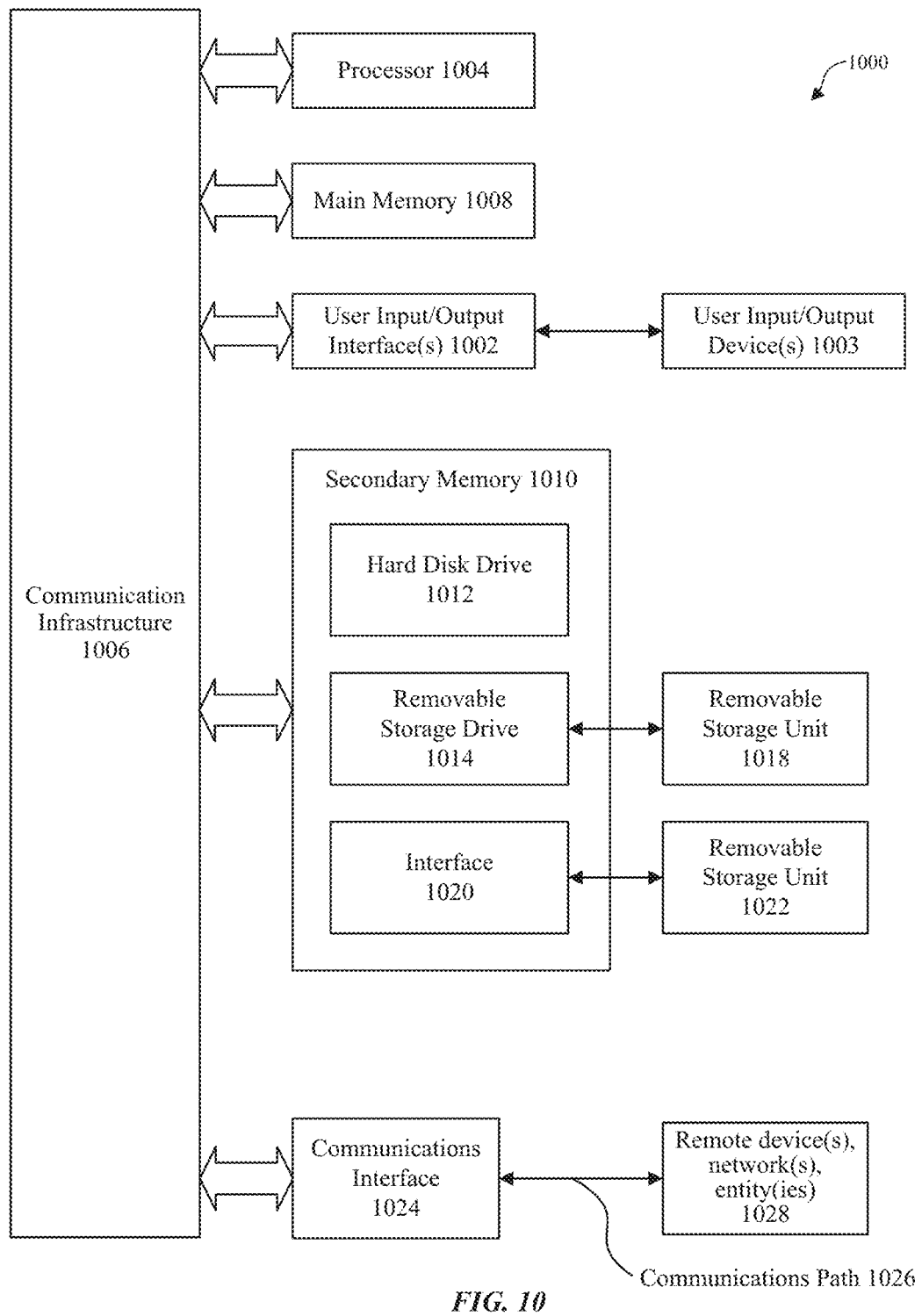
FIG. 10 is an example computer system for implementing some aspects or portion(s) thereof.

Various aspects can be implemented, for example, using one or more computer systems, such as computer system 1000 shown in FIG. 10. Computer system 1000 can be any well-known computer capable of performing the functions described herein such as devices 101, 103, 105 of FIG. 1, or 200 of FIG. 2. Computer system 1000 includes one or more processors (also called central processing units, or CPUs), such as a processor 1004. Processor 1004 is connected to a communication infrastructure 1006 (e.g., a bus.) Computer system 1000 also includes user input/output device(s) 1003, such as monitors, keyboards, pointing devices, etc., that communicate with communication infrastructure 1006 through user input/output interface(s) 1002. Computer system 1000 also includes a main or primary memory 1008, such as random access memory (RAM). Main memory 1008 may include one or more levels of cache. Main memory 1008 has stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to some aspects, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

The operations in the preceding aspects can be implemented in a wide variety of configurations and architectures. Therefore, some or all of the operations in the preceding aspects may be performed in hardware, in software or both.

In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1000, main memory 1008, secondary memory 1010 and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 10. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect," "an example aspect," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

What is claimed is:

1. A user equipment (UE), comprising:
   a transceiver configured to wirelessly communicate with a wireless network; and
   a processor, communicatively coupled to the transceiver, configured to:
      monitor, using the transceiver, a shared downlink control channel for downlink control information (DCI) in a discontinuous repetition (DRX) cycle, the DCI having a paging message that indicates the UE is to enter a skip paging monitoring mode;
      start a paging inactivity timer in response to detecting the paging message in the DRX cycle does not include an address associated with the UE;
      skip one or more paging occasions within the DRX cycle in response to an expiration of the paging inactivity timer in the DRX cycle; and
      process the paging message in response to detecting the paging message in the DRX cycle includes the address associated with the UE.

2. The UE of claim 1, wherein the processor is further configured to:
   define the paging inactivity timer corresponding to a value associated with paging occasions to monitor; and
   wherein the value associated with the paging occasions represents at least one of a duration period or a number of monitoring occasions.

3. The UE of claim 2, wherein the processor is further configured to initialize the paging inactivity timer in response to detecting the paging message in the DRX cycle does not include the address associated with the UE.

4. The UE of claim 3, wherein the processor is further configured to skip the one or more paging occasions based on the value associated with the paging occasions.

5. The UE of claim 1, wherein the processor is configured to receive, from the wireless network, the DCI that includes an information element (IE) to indicate the UE is to enter the skip paging monitoring mode.

6. The UE of claim 5, wherein the IE indicates whether additional paging occasions should be monitored by the UE.

7. The UE of claim 5, wherein the processor is further configured to receive, from the wireless network, the paging message using Radio Resource Control (RRC) layer signaling.

8. The UE of claim 7, wherein the processor is further configured to receive, from the wireless network, a Demodulation Reference Signal (DMRS) signal to detect the DCI.

9. A method, comprising:
   monitoring, by a user equipment (UE) of a wireless network, a shared downlink control channel for downlink control information (DCI) in a discontinuous repetition (DRX) cycle, the DCI having a paging message that indicates the UE is to enter a skip paging monitoring mode;

starting, by the UE, a paging inactivity timer in response to detecting the paging message in the DRX cycle does not include an address associated with the UE;

skipping, by the UE, one or more paging occasions within the DRX cycle in response to an expiration of the paging inactivity timer in the DRX cycle; and processing, by the UE, the paging message in response to detecting the paging message in the DRX cycle includes the address associated with the UE.

10. The method of claim 9, further comprising:

defining, by the UE, the paging inactivity timer corresponding to a value associated with paging occasions to monitor, wherein the value associated with paging occasions represents at least one of a duration period or a number of monitoring occasions.

11. The method of claim 10, further comprising initializing the paging inactivity timer in response to detecting the paging message in the DRX cycle does not include the address associated with the UE.

12. The method of claim 11, further comprising skipping the one or more paging occasions based on the value associated with the paging occasions.

13. The method of claim 9, further comprising: receiving, from the wireless network, the DCI that includes an information element (IE) to indicate the UE is to enter the skip paging monitoring mode.

14. The method of claim 13, wherein the IE indicates whether additional paging occasions should be monitored by the UE.

15. The method of claim 13, further comprising: receiving, from the wireless network, the paging message using Radio Resource Control (RRC) layer signaling.

* * * * *